3,477,868
METHOD OF MAKING A PROTECTIVE COATING AT THE SURFACE OF A SOLID BODY
Friedrich Grundschober, Confignon, Geneva, and Joerg Sambeth, Carouge, Geneva, Switzerland, assignors to Battelle Memorial Institute, International Division, Carouge, Geneva, Switzerland, an American body corporate
No Drawing. Filed Oct. 10, 1966, Ser. No. 585,252
Claims priority, application Switzerland, Oct. 15, 1965, 14,259/65
Int. Cl. B44d 1/097; B32b 15/04; C23c 11/06
U.S. Cl. 117—46                    11 Claims

ABSTRACT OF THE DISCLOSURE

Materials are coated by applying layers of a solution of a polymer comprising a chain of boron and silicon atoms bonded by oxygen and further containing organic radicals. The layer of the polymer is pyrolyzed at 600–1300° C. to remove the organic radicals while leaving the chain of boron and silicon intact.

---

This invention relates to a method of making a protective coating at the surface of a solid body.

As is well known, the oxides and carbides of boron and silicon have excellent thermal and mechanical properties which render them particularly suitable for use as coatings. They are especially suitable for use as coatings for the protection of metals at high temperature. Applying these substances onto the surfaces to be protected, however, presents considerable difficulties in actual practice, these difficulties being due in particular to the high melting points of the substances.

According to a well known technique, a fine powder, called a frit, is prepared, which contains the substances serving to form the coating, the frit is dispersed in a liquid medium, and the object to be protected is coated with the dispersion, either by brush or a spraying device, or by immersion, and the coated object is heated to the melting and curing temperature of the frit used. This heating serves to melt and agglomerate the constituents of the frit so as to form a vitreous coating thereof and the temperatures used for this purpose are considerably higher than 1300° C. in many cases.

It is also known to make protective coatings by spraying by means of a flame. This technique necessitates premixing of the required oxides in powder form and introducing the mixture into a suitable burner. It is, however, difficult to obtain a mixture having a uniform composition without carrying out several complicated steps.

With a view to avoiding this disadvantage, it has also been suggested to deposit a coating of a ceramic inorganic compound by spraying by means of a flame, this being done by simultaneously introducing in the latter a fluid mixture comprising a combustion-supporting gas and compounds of the elements required for forming said coating, at least one of said compounds being an organic compound. This allows the combustion of said compounds so as to maintain the flame above the melting temperature of the inorganc compound serving to form said coating and the projection of the compound, which is obtained in the molten state in droplet-form, onto the surface to be covered.

These known processes for depositing coatings by projection by means of a flame required relatively complicated equipment for uniform mixing of the compounds in the burner itself and exact regulation of the flame, so as to obtain droplets having the required composition and state.

The object of this invention is to avoid the above mentioned disadvantages of the known processes while allowing a protective coating including compounds of boron and silicon to be made, this being done by applying onto the surface to be protected a suitable semi-organic polymer comprising boron and silicon and organic radicals and by then subjecting the polymer to pyrolysis at a temperature at which these organic radicals are eliminated and the inorganic part of the polymer i.e. the boron and silicon is obtained as residue. It thus becomes possible to produce the desired compound on the surface itself by heating the polymer to a temperature which is considerably lower than the temperatures required for carrying out the above mentioned processes of flame projection.

The present invention provides a method of making a protective coating at the surface of a solid body, said method comprising the steps of applying a layer of a solution of a polymer in an inert organic solvent at least once onto said surface, said polymer comprising a main chain formed by atoms of boron and silicon bonded by oxygen atoms and substituted, at least in part, by organic radicals belonging at least to one of the alkyl, aryl, alkoxy and acyl groups, evaporating the solvent each successive application so as to obtain the polymer in the form of a dry layer on said surface, and subjecting said polymer to pyrolysis by heating to a temperature allowing the decomposition of said organic radicals while avoiding any appreciable depolymerization of the main chain of the polymer.

The pyrolysis is effected at a temperature between 600 and 1300° C. The pyrolysis may be effected in the presence of an inert gas such as argon.

The following examples show the manner in which suitable polymers may be prepared and applied to make a protective coating according to the present invention.

Example 1

A mixture of 18 grams of dimethyl-polysiloxane having a viscosity of 100 cst. and 7 grams of boric oxide is heated, while stirring, to 210 to 230° C. for approximately 12 hours, whereby a polymer is produced.

A solution of this polymer in benzene, is then applied by brush onto the surface of a steel plate. After drying in air at 80° C. for approximately 10 minutes, the benzene is completely evaporated and one thus obtains a dry layer of polymer. This layer is then subjected to pyrolysis at 800° C. for 10 minutes, in an electric furnace preheated to 800° C.

Example 2

A mixture of 9.5 grams of phenyl boric acid and of 17 grams of diphenylsilanediol is heated to 260° C. for 18 hours. One thus obtains a solid polymer which is applied in solution in benzene, dried and pyrolyzed in the manner described above with reference to Example 1.

Example 3

A mixture of 15.2 grams of oxy-bis(diacetoxyborane) and 20.8 grams of tetraethoxy silane is heated to boiling temperature, while stirring. The mixutre is refluxed for approximately 15 minutes until solution is complete. The mixture is left to cool so as to precipitate the polymer in the form of a white paste. The polymer thus obtained is next dissolved in ethyl acetate and applied, dried and pyrolyzed in the manner described above with reference to Example 1.

A single coating obtained in this manner weighed 0.4 grams per sq. cm. of the surface and a double coating obtained in two identical stages weighed 0.97 milligram per sq. cm. of the surface.

The effectiveness of such a protective coating on a metallic specimen was determined as follows:

A mild steel plate completely covered with a protective coating was heated in air at 800° C. for 10 hours. No weight increase due to oxidation could be determined. A similar plate without a coating underwent appreciable oxidation under the same conditions, giving a weight increase of 6 milligrams per sq. cm. of the surface of the plate.

Another test allowed the effectiveness of such a double protective coating against oxidation of graphite to be established. In this test, a graphite rod was completely covered and after heating for four hours at 800° C., the rod retained its initial dimensions. A similar non-protected rod, was completely decomposed by oxidation after undergoing the same heating.

The process according to the invention is well suited for making protective layers on a graphite body. To ensure effective protection, however, a multiple layer completely surrounding the graphite body should be formed.

The above examples have obviously only been given by way of indication and may be modified.

The polymers used in the coating may be prepared from other compounds and may be applied and subjected to pyrolysis in a different manner. The application of the solution onto the surface may be effected either by immersion or by spraying, while the pyrolysis may be obtained by localized heating of the coating or by other suitable means.

We claim:

1. A method of making a protective coating at the surface of a solid body, comprising the steps of applying layers of a solution of a polymer in an inert organic solvent at least once onto said surface, said polymer comprising a main chain formed by atoms of boron and silicon bonded to one another by oxygen atoms and substituted, at least in part, by organic radicals selected from the group consisting of alkyl, aryl, alkoxy and acyl groups, evaporating the solvent after each successive application to obtain the polymer in the form of a dry layer on said surface, and subjecting said polymer to pyrolysis by heating same to a temperature at which decomposition of said organic radicals occurs while avoiding appreciable depolymerization of the main chain of the polymer.

2. A method according to claim 1, in which said pyrolysis is carried out at a temperature between 600 and 1,300° C.

3. A method according to claim 1, in which the duration of said pyrolysis is less than 10 minutes.

4. A method according to claim 1, in which said pyrolysis is carried out in the presence of an inert gas.

5. A method according to claim 4, in which said inert gas is argon.

6. A method according to claim 1, in which said solution is applied onto the surface by immersion.

7. A method according to claim 1, in which said coating is applied in two superposed layers.

8. A method according to claim 1, wherein the solid body is a graphite body, and comprising applying said solution onto the surface of said graphite body in a first layer which is relatively thin with respect to the desired coating and which covers the surface of said graphite body completely, evaporating said solvent rapidly to prevent penetration thereof into said graphite body, subjecting said polymer to pyrolysis and repeating the application, evaporation and pyrolysis to form by stages a protective coating having the desired thickness.

9. A method according to claim 1, in which said solution is applied by brush onto said surface.

10. A method according to claim 8 in which said solution is applied by brush onto said surface.

11. A method according to claim 1 in which the organic radicals are methyl, phenyl, ethoxy and acetoxy.

References Cited

UNITED STATES PATENTS

| | | |
|---|---|---|
| 2,829,981 | 4/1958 | Shapiro. |
| 2,941,899 | 6/1960 | Stalego. |
| 3,140,779 | 7/1964 | Dalton et al. |
| 3,183,206 | 5/1965 | Kniege _____ 117—135.1 XR |
| 3,291,772 | 12/1966 | Boot et al. |
| 3,379,607 | 4/1968 | Foster et al. ____ 117—135.1 XR |
| 3,392,036 | 7/1968 | McLeod _____ 117—135.1 XR |
| 3,399,078 | 8/1968 | Bang _____ 117—129 |

FOREIGN PATENTS 760,623  11/1956  Great Britain.

DAVID KLEIN, Primary Examiner

U.S. Cl. X.R.

117—129, 135.1; 260—46.5

Dedication 3,477,868.—*Friedrich Grundschober*, Confignon, Geneva, and *Joerg Sambeth*, Carouge, Geneva, Switzerland. METHOD OF MAKING A PROTECTIVE COATING AT THE SURFACE OF A SOLID BODY. Patent dated Nov. 11, 1969. Dedication filed Mar. 26, 1984, by the assignee, *Battelle Memorial Institute*.

Hereby dedicates to the People of the United States the entire remaining term of said patent.

[*Official Gazette June 12, 1984.*]